United States Patent

[11] 3,578,194

| [72] | Inventor | Richard T. Cornelius |
| | | Minneapolis, Minn. |
| [21] | Appl. No. | 761,086 |
| [22] | Filed | Sept. 20, 1968 |
| [45] | Patented | May 11, 1971 |
| [73] | Assignee | The Cornelius Company |
| | | Anoka, Minn. |

[54] THROW-AWAY BEVERAGE BOTTLES
7 Claims, 8 Drawing Figs.

| [52] | U.S. Cl. | 215/13 |
| [51] | Int. Cl. | B65d 11/04, B65d 11/22 |
| [50] | Field of Search | 215/1.5, 12, 13; 222/105, 183, 184; 150/.5; 220/69; 229/89, 90 |

[56] References Cited
UNITED STATES PATENTS

| 285,705 | 9/1883 | Tallman | 215/12 |
| 1,499,118 | 6/1924 | Morgan | 220/69X |
| 1,525,567 | 2/1925 | Cadby | 215/12 |
| 2,131,714 | 9/1938 | Woelfer | 222/184 |
| 2,135,236 | 11/1938 | Koppelman | 215/12UX |
| 2,180,841 | 11/1939 | Vogt | 229/14(BI) |
| 2,422,314 | 6/1947 | Rheinstrom | 229/89X |
| 2,481,015 | 9/1949 | Ingersoll | 220/69 |
| 2,837,245 | 6/1958 | Grebowiec | 215/1(.5)X |
| 2,872,068 | 2/1959 | Johnson | 220/69 |
| 3,325,030 | 6/1967 | Rausing et al. | 215/12 |
| 3,339,605 | 9/1967 | Ignell | 215/1(.5)X |

FOREIGN PATENTS

| 654,090 | 3/1963 | Italy | 215/12 |
| 6,603,444 | 9/1966 | Netherlands | 150/.5 |

Primary Examiner—Doanld F. Norton
Attorney—Hill, Sherman, Meroni, Gross & Simpson ABSTRACT: Low cost, large capacity, lightweight plastic bottles, especially suitable for carbonated beverages, have burst-resistant construction in which an upright wall and a concave-convex bottom wall may have the thinnest practicable wall section; and a combination label and a bottle-supporting skirt is affixed to the lower end portion of the bottle.

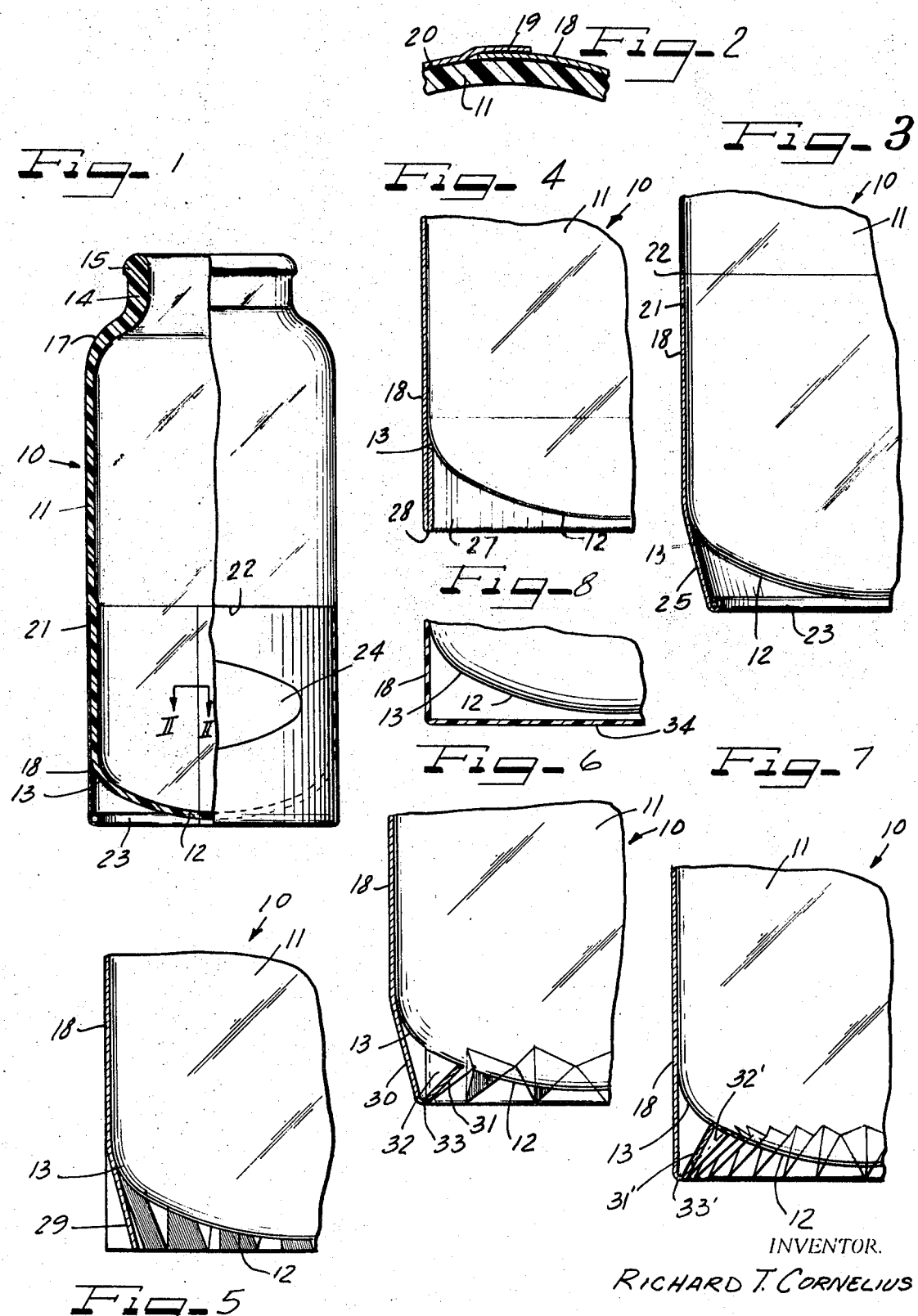

THROW-AWAY BEVERAGE BOTTLES

This invention relates to throw-away bottles and is more particularly concerned with plastic bottles especially suitable for carbonated, pressurized or expansible gas-containing beverages.

Glass and metal have commonly been used for beverage containers. Glass bottles of returnable variety have a high loss ratio due to breakage and ordinarily involve the nuisance of requiring a deposit from the purchaser to assure return of the bottles and to help amorize the cost of bottles not returned. In addition, the dead load of glass bottles presents a substantial shipping and handling cost factor. Further, due to the large safety factors necessary in glass bottles due to brittleness of the material, much valuable space is occupied by the sheer bulk of the bottle walls.

In respect to metal cans of containers and glass throw-away bottles, the unit cost is rather high, and as the cost of living increases those costs are being increased. Also, there is considerable problem of disposal of throw-away metal cans and glass bottles which are relatively incombustible.

With both glass and metal containers, condensate runoff and staining is a substantial problem where the contents are chilled.

Whereas glass bottles are liable to breakage in handling, metal cans are liable to denting and deformation and where seamed, liable exposure of a raw metal edge to the beverage.

Another problem in respect to both glass and metal containers is that relatively massive, expensive machines are required to manufacture the same and relatively highly skilled personnel required to operate the machines. As a result, glass and metal containers customarily require transportation from the container-making plant to the bottling works, adding an additional handling cost factor of some magnitude, which is magnified by the fact that shipments of empty containers in fact also constitute shipments of atmospheric air.

The foregoing and other disadvantages and difficulties are overcome by the present invention by the provision of new and improved throw-away one-piece molded, substantially rigid plastic bottles with affixed supporting skirt means.

An important object of the present invention is to provide a new and improved throw-away plastic beverage bottle construction.

Another object of the invention is to provide a new, low cost throw-away plastic bottle construction especially suitable for high carbonation beverages.

A further object of the invention is to provide a new and improved low cost, lightweight, large capacity throw-away plastic bottle especially suitable for the sale of high carbonation beverages for any mode of sale, by the bottle, by the case, by automatic vending machines, and the like.

Still another object of the invention is to provide a new and improved throw-away beverage bottle construction which is adapted to be manufactured on the premises of the bottler to avoid any need for transportation from a bottle making plant to the bottling works.

It is also an object of the invention to provide a new and improved throw-away plastic bottle construction which lends itself advantageously to labeling, on an affixed base skirt stand.

Other objects, features and advantages of the present invention will be readily apparent from the following detailed description of certain preferred embodiments thereof taken in conjunction with the accompanying drawing in which:

FIG. 1 is a side elevational view of a throw-away plastic bottle embodying features of the invention and showing the same partially cutaway and in section;

FIG. 2 is a fragmentary enlarged sectional detail view taken substantially along the line II—II of FIG. 1;

FIGS. 3 to 8, inclusive are fragmentary sectional elevational views showing respective modifications in the bottom end supporting means for the plastic bottles.

On reference to FIG. 1, a substantially rigid plastic bottle 10 is shown which may be molded from any suitable nonglass plastic material such as one of the synthetic plastics which lend themselves to thermoplastic molding under relatively high-speed production methods of manufacture, and more particularly by blow molding. Clear polystyrene is a suitable material for the bottles, having the attributes of low cost, lightweight, high burst and tensile strength in an economical minimum bottle wall thickness, substantial rigidity, attractive finished appearance, etc.

For beverage sales a clear bottle is often desirable to enhance consumer identification of the bottle contents. For some beverages which the consumer is accustomed to purchase in bottles of a particular tint, such as brown, green, and the like, the bottles may be appropriately tinted.

In a desirable configuration, the bottle 10 is of about the same outside diameter as a conventional glass bottle intended for the same or a smaller volume of contents, so that existing bottle venders may be utilized to enable some bottling plant equipment to be used. For example for 6½ ounce fluid volume capacity, which is a common size, a substantially cylindrical vertical wall 11 of the bottle is desirably about 2⅛ inches in outside diameter. Where polystyrene is utilized, and the bottle is intended for relatively high carbonation beverages such that the bottle should withstand internal pressures of at least 100 lbs. per sq. in. at temperatures up to 110° F., a wall thickness of 0.062 in. minimum will serve the purpose.

Not only the vertical wall 11, but also a bottom wall 12 of the plastic bottle may be of the same thickness uniformly throughout the area thereof, namely a minimum of 0.062 in. to meet the conditions prescribed. To meet internal pressure conditions efficiently, the bottom 12 is constructed in downwardly bulging convex semiellipsoidal form with a relatively large radius major area and a suitable smaller radius juncture 13 effecting smoothly rounded integral joinder with the vertical wall 11. For example, in an efficient construction, the bottom wall 12 may be constructed on a 1.75 in. radius, while the juncture 13 may be on a 0.375 in. radius. By having the bottom wall on a relatively large radius, providing a shallow dished bottom, the height of the bottle is substantially reduced as compared to a generally spherical bottom.

On its upper end, the bottle 10 is provided with means for receiving a suitable removable or at least openable closure cap. In providing a filling and discharge mouth, On its upper terminal end the neck 14 has a radially outwardly projecting annular cap-retaining bead 15. In order to withstand cap-applying pressures, and then the binding, sealing, retaining compression exerted by an attached closure cap, the neck 14 is desirably of greater thickness than the wall 11. For example, it may be on the order of about three times or slightly greater in thickness at its maximum under the bead 15, with a gradual diminution of thickness to a smooth and uniform rounded juncture with the wall 11. For efficient compression and burst resistance, a curved shoulder 17 joins the wall 11 with the neck 14, being formed on about a 0.500 in. radius in the wall juncture portion thereof and with the radius of curvature at juncture with the neck 14 being on the order of 0.375 in.

Because the wall thickness of the plastic bottle 10 is so much less than the wall thickness of a corresponding contents volume glass bottle, the height of the bottle 10 can be substantially less than a corresponding glass bottle. For example, for 6½ ounce capacity, the plastic bottle 10 may be only 4.75 in. measured from the outside surface at the lowest point of the bottom wall 12 to the top of the neck 14. In contrast, glass carbonated beverage bottles the same capacity are generally 7¾ to 8 ins. in height.

Means are provided for enabling the bottle 10 to stand upright on a surface even though the bottom wall 12 is of the desirable outwardly convex shape. In a desirable form, such means comprise a base skirt 18 affixed to the wall 11 of the plastic bottle. This skirt is made of any desirable low cost sheet material. Water resistant paper, impact extruded plastic, vacuum formed plastic, and the like may be employed. Desirably material for the skirt bottle base is of a generally insulating type so that condensate formation and runoff may be eliminated or at least greatly minimized where the bottle contents are chilled and the chilled bottle exposed to a humid environment.

Where the base sleeve 18 is made from strip sheet material, it may be preformed on a mandrel or it may be wrapped directly onto the bottle from a flat panel condition, with vertical margins overlapped to provide a joint secured as by means of suitable adhesive 19, FIG. 2. A suitable adhesive 20 may be employed between the confronting surfaces of the sleeve 18 and the wall 11 to maintain the sleeve in position, although where suitable tension can be maintained in the sleeve after wrapping onto the wall 11, the adhesive may not be necessary. For example, where the material of the base sleeve 18 is of a material having sufficient resilience such as plastic sheet, plastic coated thin paper sheet, and the like, and where a rapid curing lap joint is provided either adhesively, or by thermoplastic bonding, slight stretching of material as it is rolled onto the bottle may suffice to maintain a tensioned grip of the sleeve on the bottle. Where the sleeve 18 is preformed from plastic or other material, the sleeve may be press fitted onto the bottle in a suitable manner, although adhesive attachment may be employed.

In order to avoid hangups or catching on one another or on handling equipment, automatic vending machine equipment and the like, a flush relationship of the outer surface of the base sleeve 18 and the outer surface of the wall 11 is desirably provided where, as shown, in FIG. 1, the sleeve is substantially shorter than the length of the bottle in the most economic arrangement. This also provides the advantage that since the sleeve has its upper edge below but adjacent to the midheight of the bottle, the major portion of the bottle is exposed above the upper edge of the sleeve, enabling observation and possible identification of the contents similarly as with a glass bottle. For this purpose, the annular area encompassed by the sleeve is of a reduced diameter a shown at 21 substantially equal to the thickness of the material of the sleeve. Thereby, when the sleeve has been applied to the bottle, it, in effect, provides a continuation of the cylindrical outer surface of the wall 11. An advantage gained from providing the bottle with the inset sleeve-receiving lower end portion area 21 is that an offsetting shoulder 22 provided at the juncture of the reduced diameter area with the upper full diameter of the bottle wall serves as a gauge for applying the sleeve accurately to the bottle. Further, the annular shoulder 22 provides a stop which is useful in holding the sleeve 18 against axial displacement toward the neck end of the bottle under axial pressure applied directly to the sleeve from its lower end or applied to the upper end of the sleeve by force exerted axially against the top of the bottle. Thus, where during the sleeve applying process the lower end of the sleeve is manipulated to provide it with means such as a curled lower end or base reinforcing bead 23, the stop shoulder 22 absorbs the curling thrust imposed on the sleeve. During capping, thrust pressure on the sleeve is desirably relieved by supporting means applied to the base 12, but at least after the bottle has been filled and is loaded into a carrier, the skirt 18 may be required to support at least proportionate load in a stack of filled containers and the shoulder 22 serves in its axial displacement preventing function with respect to the sleeve. While it is desirable to have the lowest point of the bottom wall 12 as close as practicable to the base plane across the bottom of the bead 23, it is desirable to maintain a tolerance differential between such base plane and the low point of the wall 12 wherein the low point is positively spaced above the plane to assure a stable seating of the lower edge of the base skirt on a supporting surface without interference from the bottom of the bottle. Nevertheless, should there be such an unusual downward pressure on the bottle as to cause slight buckling of the sleeve, the bottom wall 12 may thrust against the supporting surface to relieve the skirt from collapsing.

A further advantage in providing the bottle 10 with the base skirt 18 resides in the ability of the skirt 18 to receive advertising indicia 24, explanatory wording, contents labeling requirements, and the like. This is especially desirable where the bottle cap is of small size and it is difficult to place thereon all the labeling that may be required by various governmental regulations. Further, by providing the bottle with a skirt, a standard bottle may be used for various name brands, so that a bottler supplying various name brands or various kinds of flavors of beverages may use a standard bottle and apply suitable differentiating label base skirts to distinguish the contents or the brands.

In order to provide for greater ease in loading the bottle 10 into a carrier having bottle-receiving compartment dividers, the lower end portion of the base skirt 18 may be annularly tapered downwardly and inwardly as shown at 25 (FIG. 3) extending from general tangency to the rounded juncture 13 between the upright wall 11 and the bottom wall 12 of the container, and bracing the flange 25.

An especially sturdy base end structure of the sleeve 18 is provided by an inturned base end flange 27 as shown in FIG. 4 which desirable lies flat against the confronting annular area of the sleeve, may be reenforced by adhesive attachment to the sleeve, and may be folded into place before the sleeve is applied to the bottle, if desired. At its distal extremity, the reenforcing flange 27 may abut the bottom wall portion 13. At the juncture of the flange 27 with the body of the skirt 18, a smooth reenforced edge 28 is provided as a seating edge for the unit. If preferred, of course, the flange 27 may be a separate strip attached suitable as by adhesive or bonding to the confronting lower margin of the skirt 18 as a reenforcement therefore.

Reenforcement of the lower foot or seating end of the base skirt 18 may also be effected in the manner shown in FIG. 5. In this arrangement, the lower end portion of the skirt is formed with an annular series of uniform generally triangular crimps 29 merging with the skirt at the juncture 13 of the walls 11 and 12 of the bottle and bearing against the juncture in a stabilized relation.

On reference to FIG. 6 a particularly rugged foot end structure for the skirt 18 is depicted comprising a generally frustoconical inwardly and downwardly tapering terminal portion 30 having a turned up reenforcing and stabilizing flange 31 provided with an annular series of uniform generally triangular fan-fold crimps 32 having their distal ends engaged against the bottom wall 12. At the fold juncture of the flanges 30 and 31 a fairly rigid seating rib 33 reenforced by the struts provided by the crimps 32 provides a firm supporting base for the bottle.

In FIG. 7 the arrangement is similar to FIG. 6 except that the lower end portion of the skirt extends cylindrically to the seating rib or foot 33' at juncture of the lower end portion of the skirt body with the upwardly and inwardly turned reenforcing terminal flange 31' which has tucks 32' therein having their distal end portions engaging the convex surface of the bottom wall 12 adjacent to the rounded juncture 13.

As represented in FIG. 8, the base skirt 18' may be constructed of generally cup shape, with a bottom wall 34. This provides a positive reenforcement for the lower supporting edge of the skirt. The wall 34 in addition seals the bottom of the skirt for any desirable purpose. This type of cup-shaped base skirt may be efficiently made by vacuum forming the same from suitable plastic sheet material.

From the foregoing, it will be apparent that the present invention provides a desirable plastic bottle construction for pressurized contents and more particularly high carbonation beverages. The bottle has substantially greater volumetric efficiency than glass bottles of similarly rated capacity.

The attached skirt affords at least some protection for the bottom of the plastic bottle, serving not only as a cushioning medium but as a reenforcement. A lighter weight bottle is provided than comparable glass bottles. Breakage hazard is eliminated. Not only does the attached skirt provide an efficient stand for the bottle while enabling the most economical and efficient thin wall bottom structure, but it also serves as a message and identification carrier, that is as a label. By its construction, the skirt prevents scratching of a relatively soft surface upon which the bottle is heavily deposited or shifted laterally. Because the skirt has insulating value, condensate formation on a chilled bottle is minimized and runoff substantially avoided, thus preventing water stain on susceptible supporting surface finishes. The skirt protects the bottle from shock if the bottle or a pack of the bottles is dropped or precipitately deposited onto a supporting surface. Scratching of the skirt-encased lower and most susceptible portion of the bottle is prevented, so that burst resistance of that portion of the bottle is effectively preserved. Ready disposability of the bottle when discarded, as by incineration, is an important attribute. Further the bottle lends itself readily to crushing and compaction in mechanical trash collection apparatus.

Bottlers can economically make their own plastic bottles by having on the premises a blow molding machine to which the bottler supplies the plastic raw material. Affixing of the skirt and filling of the bottles can be effected on a common production line.

It will be understood that modifications and variations may be effected without departing from the scope of the novel concepts of the present invention.

I claim:

1. In a bottle adapted for pressurized contents:
a seamless substantially rigid molded synthetic plastic body resistant to distortion from internal or external pressure;
said body having an upright wall and a downwardly bulged bottom wall merging on a smooth curvature juncture with said upright wall; and
a base skirt sleeve of sheetlike insulating material affixed as a sleeve about the lower portion of said body with the upper edge of the sleeve below but adjacent to midheight of said upright wall so that the major portion of the bottle is exposed above the upper edge of the sleeve, said skirt having a downwardly integral extension from the sleeve providing a stand for the bottle extending downwardly below said bottom wall to support the bottom wall above a supporting surface, the stand portion having at least a portion thereof turned toward and engaging the bottom surface of the bottle.

2. A bottle according to claim 1, said turned portion comprising an up-turned flange crimped for reinforcement and distal ends of the crimps engaging said bottom surface.

3. In a bottle adapted for pressurized contents:
a seamless rigid molded transparent synthetic plastic body resistant to distortion from internal or external pressure and axial capping forces;
said body having an upright substantially cylindrical wall, a large radius shallow-dished bottom wall of outwardly convex and inwardly concave formation merging with said upright wall on a uniform relatively small radius smooth curvature juncture, and a reduced diameter neck on the upper end of said upright wall defining a mouth for the bottle; and
a base skirt of sheetlike insulating material permanently affixed as a conforming cylindrical sleeve about the lower portion of said body with the upper edge of the sleeve below but adjacent to midheight of the bottle so that the major portion of the bottle is exposed above the upper edge of the sleeve enabling identification of contents;
said sleeve of the skirt extending continuously as a reinforcement, cushion and insulator from said upper edge downwardly past and in reinforcing contiguity to said juncture and projecting below said bottom wall to provide a stand for the bottle and due to the insulating characteristics of the skirt material at least greatly minimizing condensate formation and runoff where the contents of the bottle are chilled and the chilled bottle exposed to a humid environment.

4. In a bottle adapted for pressurized contents:
a seamless substantially rigid molded synthetic plastic body resistant to distortion from internal or external pressure;
said body having an upright wall, a large radius shallow-dished bottom wall of outwardly convex and inwardly concave formation merging with said upright wall on a uniform relatively small radius smooth curvature juncture, and a reduced diameter neck on the upper end of said upright wall defining a mouth for the bottle; and
a base skirt of sheetlike insulating material affixed as a sleeve about the lower portion of said body and extending continuously from an upper edge downwardly past said juncture and projecting below said bottom wall, bearing in bracing relation against said merging smooth juncture and providing a stand for the bottle.

5. A bottle according to claim 4, in which said stand tapers inwardly and downwardly tangent to said juncture and into underlying relation thereto.

6. A bottle according to claim 4, in which said stand portion comprises an inturned flange having its distal extremity in abutting relation against said juncture.

7. A bottle according to claim 4, in which said stand has an upwardly and inwardly turned reinforcing terminal flange with its distal edge in engagement with said bottom wall.